United States Patent [19]

Usui et al.

[11] 4,328,679

[45] May 11, 1982

[54] CAPABILITY CONTROL APPARATUS FOR COOLING SYSTEM HAVING DIRECT EXPANSION TYPE EVAPORATOR

[75] Inventors: Sampei Usui; Tomihisa Ohuchi, both of Ibaraki, Japan

[73] Assignee: Hitachi, Ltd., Tokyo, Japan

[21] Appl. No.: 223,003

[22] Filed: Jan. 6, 1981

[30] Foreign Application Priority Data

Jan. 16, 1980 [JP] Japan ................... 55-2619

[51] Int. Cl.$^3$ ............................................. F25B 15/00
[52] U.S. Cl. ........................................ 62/141; 62/148; 62/476
[58] Field of Search .................... 62/141, 148, 476

[56] References Cited

U.S. PATENT DOCUMENTS 3,122,002  2/1964  Miner et al. ................... 62/148
3,744,265  7/1973  Bawel ............................. 62/141
3,895,499  7/1975  Hopkins ...................... 62/148 X
4,251,997  2/1981  Newton ....................... 62/148 X

*Primary Examiner*—Lloyd L. King
*Attorney, Agent, or Firm*—Craig & Antonelli

[57] ABSTRACT

A capability control apparatus for a cooling system having a direct expansion type evaporator comprises a control valve mounted in a heating system for a generator for controlling an amount of heat to be given to the generator. Temperature sensors are mounted at inlet and outlet sides, respectively, of a cooling system for an absorber, and an arithmetic unit is connected to the temperature sensors and the control valve. The arithmetic unit calculates the amount of heat to be given to the generator based on signals transmitted from the temperature sensors to the unit and issues and transmits to the control valve a control signal for controlling the latter.

6 Claims, 5 Drawing Figures

CAPABILITY CONTROL APPARATUS FOR COOLING SYSTEM HAVING DIRECT EXPANSION TYPE EVAPORATOR

BACKGROUND OF THE INVENTION

1. Field of the Invention

This invention relates to a capability control apparatus for a cooling system provided with a direct expansion type evaporator, such as an absorption refrigerating machine.

2. Description of the Prior Art

In an absorption refrigerating machine provided with a direct expansion type evaporator, water or other heating medium is generally used as means for taking out refrigerating or cooling capabilities that have been developed in the evaporator. Further, the control of the amount of solution to be circulated and the amount of heat to be given to the generator is effected depending on changes in the temperature of the heating medium circulating through the evaporator or the temperature difference of the heating medium between the inlet and outlet thereof in accordance with a refrigerating or cooling load.

The control process described hereinabove cannot be adapted for the case where an absorption refrigerating machine including an evaporator of direct expansion type in which an air is directly cooled by the cooling (refrigerating) capabilities developed in the evaporator is used for air conditioning. The reasons for this are as stated hereinbelow.

In air conditioning, there are two types of cooling load, one being a sensible heat load and the other being a latent heat load. The sensible heat load is heat which is spent for lowering the temperature of the air to be conditioned, and the latent heat load is heat which is spent for lowering humidity of the air to be conditioned by condensing the moisture content of the air.

It is quite easy to obtain a sensible heat load based on the values of the inlet temperature of the air flowing into the evaporator and the outlet temperature of the air flowing out of the evaporator as sensed by a temperature sensor. However, difficulties are encountered in obtaining values of a latent heat load, which make it impossible to accurately grasp the cooling load. In the event that control of the cooling capabilities of a refrigerating system provided with a direct expansion type evaporator is carried out by the abovementioned control process, a lack of capabilities would result. The provision of means for sensing a latent heat load would enable acculate sensing of the cooling load to be effected. However, such sensing means poses the problems that the construction is complex and high in cost, and that the degree of accuracy with which sensing can be effected is low.

SUMMARY OF THE INVENTION

An object of the invention is to provide a capability control apparatus for a cooling system having a direct expansion type evaporator capable of accurately sensing a sensible heat load and a latent heat load.

Another object is to provide a capability control apparatus for a cooling system having a direct expansion type evaporator in which means for sensing a latent heat load is simple in construction.

Still another object is to provide a capability control apparatus for a cooling system having a direct expansion type evaporator in which means for sensing a latent heat load is low in cost.

Still another object is to provide a capability control apparatus which is suitable for use with an absorption refrigerating machine having a direct expansion type evaporator.

A further object is to provide a capability control apparatus for a refrigerating system having a direct expansion type evaporator which makes it possible to reduce the electric power consumption and pump power consumption during operation, to thereby contribute to energy conservation.

For accomplishing the aforesaid objects, the present invention is characterized by effecting control of the amount of heat for heating the generator depending on the temperature level and the amount of heat generated when the refrigerant is absorbed in a solution within the absorber. More specifically, a temperature sensor is mounted at the inlet and outlet sides of a cooling system for the absorber, and these temperature sensors are connected to an arithmetic unit for actuating a control valve mounted in the heating system of the generator.

DESCRIPTION OF THE PREFERRED EMBODIMENTS

Figure 1:
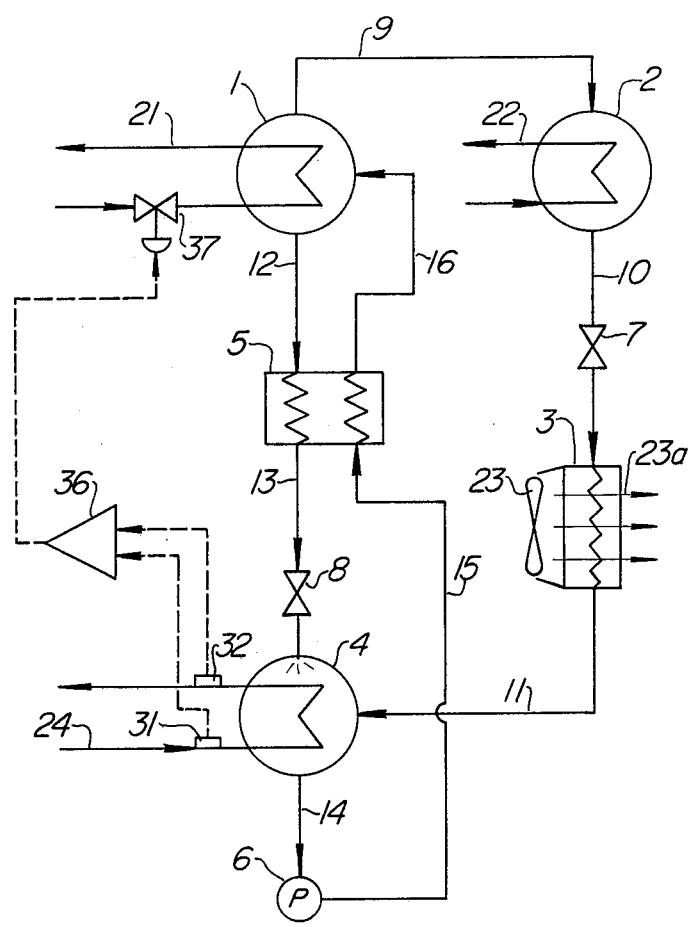
FIG. 1 is a systematic view showing a capability control apparatus of simplest construction which is constructed in accordance with a first embodiment of the invention.

In the first to fifth embodiments hereinafter stated, means and members designated by like reference characters should be understood to have substantially same construction and function, unless otherwise described.

FIG. 1 shows a capability control apparatus of a first embodiment which is simplest in construction. A generator 1 is connected via a line 9 to a condenser 2 which in turn is connected via a line 10 and an expansion valve 7 to a direct expansion type evaporator 3 having a fan 23. A absorber 4 is connected via a line 11 to the evaporator 3. Also, the absorber 4 is connected via solution lines 13 and 12 to the generator 1, the solution lines 12 and 13 mounting a solution heat exchanger 5 and an expansion valve 8. A liquid pump 6 is connected via a solution line 14 to the absorber 4 and via a solution line 15 to the solution heat exchanger 5. Numeral 16 is a line for connecting the generator 1 to the solution heat exchanger 5.

Numeral 21 designates a heating system for heating the generator 1 including a steam, high temperature water, boiler, etc. A control valve 37 is mounted at the inlet side of the heating system 21. Numeral 22 designates a cooling system for cooling the condenser 2, and numeral 24 designates a cooling system for cooling the absorber 4. Temperature sensors 31 and 32 are mounted at the inlet side and the outlet side of the cooling system 24. An arithmetic unit 36 is connected to the temperature sensors 31 and 32 and the control valve 37 mounted in the heating system 21. The generator 1 and absorber 4 contain a mixture of a refrigerant, such as Fron, and an absorbing agent, such as tetraethylene grycol dimethyl ether, etc.

The operation of the first embodiment of the construction shown and described hereinabove will now be described. The solution heated by heat from the heating system 21 in the generator 1 generates a gas of the refrigerant and concentrated into an enriched solution (solution of low refrigerant content) which is led through the solution line 12, solution heat exchanger 5 and expansion valve 8 to the absorber 4.

Meanwhile the refrigerant in a gaseous state flows through the line 9 to the condenser 2 where it is cooled by cooling water flowing through the cooling system 22 and changes into a liquid state. The liquid refrigerant flows through the line 10 and expansion valve 7 to the evaporator 3 where it is evaporated to develop refrigerating capabilities. Since the fan 23 is operative to cause air 23a to flow through the evaporator 3, the refrigerating capabilities cool the air or condense the moisture content of the air to effect air conditioning as desired.

The refrigerant in a gaseous state flow from the evaporator 3 via the line 11 to the absorber 4 where it is absorbed by the enriched solution flowing from the generator 1 to the absorber 4 via the lines 12 and 13. The heat of absorption generated at the time of absorption and the heat generated by the cooling of the solution are released from the cooling system 24 by cooling water flowing therethrough. The solution (lean solution) having absorbed the gaseous refrigerant in the absorber 4 flows through the solution line 14, liquid pump 6 and solution line 15 to the solution heat exchanger 5 where it recovers heat from the enriched solution from the generator 1 and flows back to the generator 1 via the solution line 16, thereby completing the cycle.

In this case, the values of temperatures sensed by the temperature sensors 31 and 32 mounted at the inlet side and the outlet side of the cooling system 24 of the absorber 4 are fed into the arithmetic unit 36 which calculates refrigerating load and produces a control signal which is transmitted to the control valve 37 mounted in the heating system 21 of the generator 1 to actuate same. Thus the amount of heat supplied to the generator 1 for heating same can be controlled.

A method used for calculating a refrigerating load in the process for effecting control of the refrigerating capabilities as described hereinabove will now be described.

When the volume of the refrigerant in a gaseous state produced in the evaporator 3 is denoted by D and the refrigerating capabilities developed in the evaporator 3 by $Q_E$, the following relation in approximate terms exists:

$$G_E = K_1 D \text{ (where } K_1 \text{ is the constant)} \tag{1}$$

When the temperatures at the inlet side and the outlet side of the cooling system 24 of the absorber 4 are denoted by $t_i$ and $t_o$ respectively, the temperature of the enriched solution flowing into the absorber 4 and the temperature of the lean solution flowing out of the absorber 4 by $T_i$ and $T_o$ respectively, the flow rate of the enriched solution or the lean solution by G and the heat load of the absorber 4 by $Q_A$, the following two relations (2) and (3) exist:

$$Q_A = K_2(t_o - t_i) \tag{2}$$

$$Q_A = K_3 D + K_4 \cdot G(T_i - T_o) \tag{3}$$

where $K_2$, $K_3$ and $K_4$ are the constants.

From the equations (1)-(3), the following equation can be obtained:

$$Q_E = (K_1/K_3)[K_2(t_o - t_i) - K_4 \cdot G(T_i - T_o)] \tag{4}$$

The $t_i$ and $t_o$ in the equation (4) can be detected by the temperature sensors 31 and 32 respectively, but the $T_i$, $T_o$ and G cannot be detected. However, the volume G of the solution in circulation is an amount determined at the time of designing the refrigerating machine, and it is well known that the values of $T_i$ and $T_o$ can be approximately determined by sensing $t_i$ and $t_o$ from the cycle characteristics of the refrigerating machine. Therefore, it is possible to obtain the aforesaid refrigerating load $Q_E$, although the accuracy with which the value is determined is not high.

When the heat load to be cooled at the condenser 2 is denoted by $Q_C$ and the amount of heat to be given to the generator 1 by $Q_G$, the following relations exist:

$$Q_C \approx K_5 \cdot D \tag{5}$$

$$Q_A + Q_C = Q_E + Q_G \tag{6}$$

From the equations (1), (3), (5) and (6), the following equation (7) representing the relation between $Q_G$ and $Q_E$ can be obtained:

$$Q_G = \left(\frac{K_3}{K_1} + \frac{K_5}{K_1} - 1\right) Q_E + K_4 \cdot G(T_i - T_o) \tag{7}$$

From the equations (4) and (7), the following equation (8) representing the relation between $Q_G$ and $Q_E$ can be obtained:

$$Q_G = K_2(t_o - t_i) - K_4 \cdot G(T_i - T_o) + \left(\frac{K_5}{K_1} - 1\right) Q_E + \tag{8}$$

$$K_4 \cdot G(T_i - T_o) = K_2(t_o - t_i) + \left(\frac{K_5}{K_1} - 1\right) Q_E$$

The relation between $Q_E$ and the optimum volume G of the solution in circulation may be obtained based on the equation (7) in such a manner that $Q_E$ can be maximized with the same value for $Q_G$.

The relation between the refrigerating load $Q_E$ and the amount of heat $Q_G$ to be given to the generator 1 and the relation between the refrigerating load $Q_E$ and the optimum volume G of the solution in circulation are determined at the time of designing the absorption refrigerating machine. Thus these relations are stored in the arithmetic unit 36 (including 36A, 36B, 36C and 36D shown in FIGS. 2, 3, 4 and 5 respectively), and a signal is transmitted from the unit 36 to the control valve 37 to effect control of the amount of heat $Q_G$ given to the generator 1 based on the equation (7) or (8) depending on the refrigerating load $Q_E$ obtained by the equation (4), to thereby actuate the control valve 37 as the occasion requires. In the first embodiment of the invention described hereinabove, optimum control of the volume G of the solution in circulation and the amount of heat $Q_G$ to be given to the generator 1 can be effected depending on the refrigerating load $Q_E$ with simple, inexpensive construction. Also, the amount of heat to be given to the generator 1 and the power required for operating the pump which are indispensable to the operation of the absorption refrigerating machine can be reduced and the refrigerating machine can be operated efficiently, thereby contributing to energy conservation.

Figure 2:
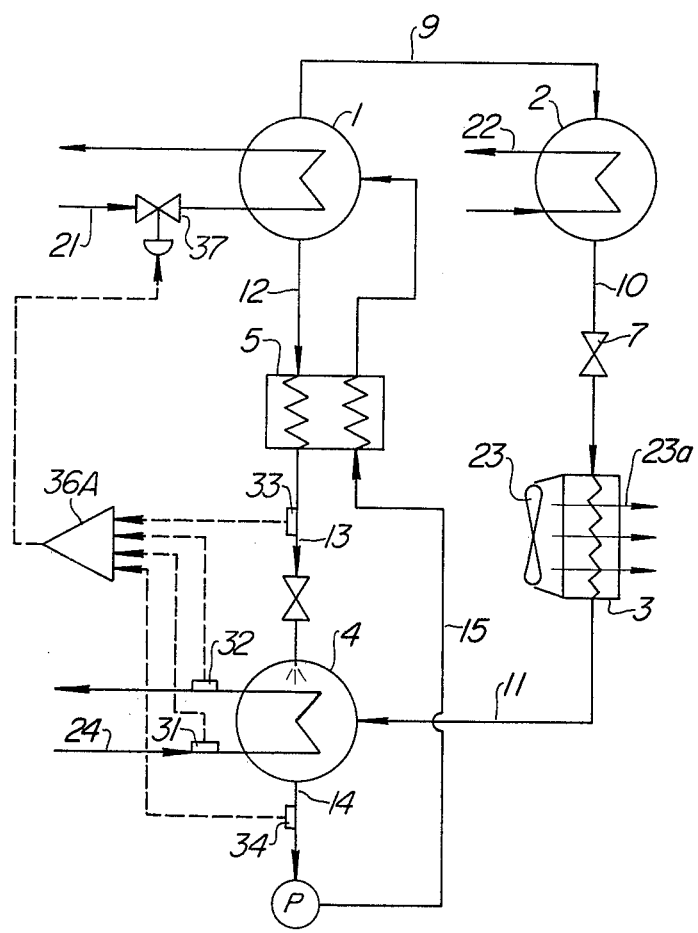
FIG. 2 is a systematic view similar to FIG. 1, illustrating a capability control apparatus according to a second embodiment of the invention.

FIG. 2 shows a second embodiment which is different from the first embodiment shown in FIG. 1 only in that temperature sensors 33 and 34 are mounted at the inlet side and outlet side of the solution system of the absorber 4 or in the solution lines 13 and 14 respectively and connected to the arithmetic unit 36A. Other parts of the machine are similar to those shown in FIG. 1 and their explanation will be omitted.

In the constructional form shown in FIG. 2, signals from the temperature sensors 31 to 34 are fed into the arithmetic unit 36A, and the refrigerating load $Q_E$ is obtained based on the equation (4) from these signals and the volume G of the solution in circulation determined at the time of designing the refrigerating machine. Then a signal is transmitted to the control valve 37 to actuate the same in such a manner that the amount of heat $Q_G$ to be given to the generator 1 is controlled based on the equation (7) or (8). It will be seen that the second embodiment enables the refrigerating machine to be operated with better results in energy conservation than the first embodiment.

Figure 3:
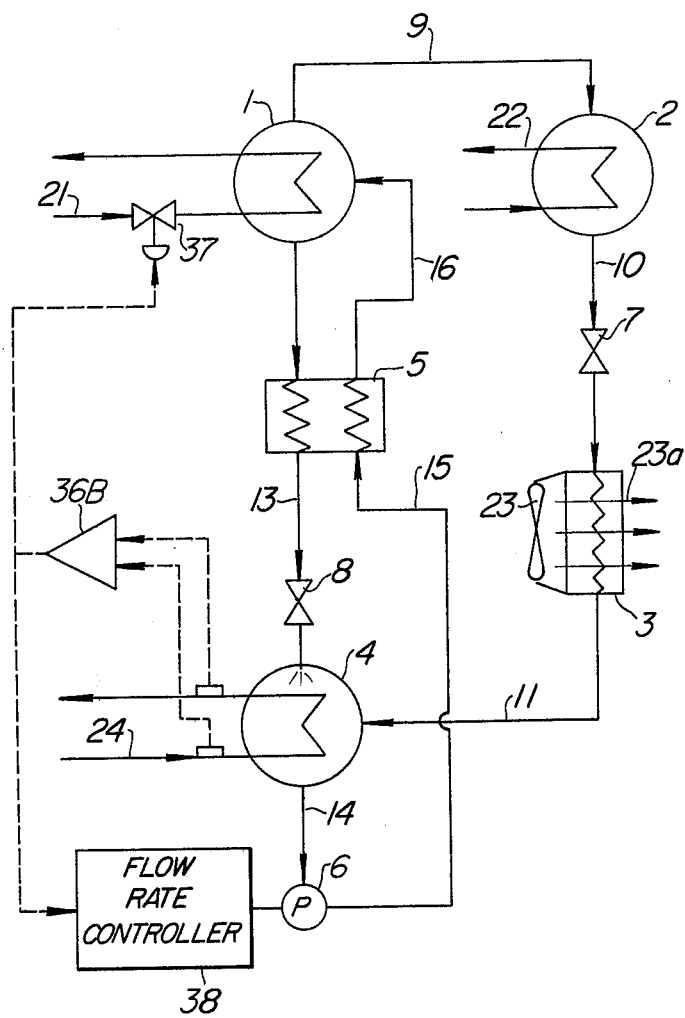
FIG. 3 is a systematic view showing a capability control apparatus according to a third embodiment of the invention.

The third embodiment shown in FIG. 3 is different from the first embodiment shown in FIG. 1 only in that a flow rate controller 38 is attached to the liquid pump 6 and connected to the arithmetic unit 36B. Other parts are similar to those shown in FIG. 1 and their explanation will be omitted. The flow rate controller 38 used in this embodiment is capable of controlling the number of revolutions of the liquid pump 6 and the number of pumps that can be activated.

In the aforesaid construction, a control signal is transmitted from the arithmetic unit 36B to the control valve 37 for the heating system and the flow rate controller 38 for the liquid pump 6, so as to control the amount of heat $Q_G$ to be given to the generator 1 and the volume G of the solution in circulation based on the equation (7) or (8) depending on the refrigerating load $Q_E$ obtained based on the equation (4). The third embodiment enables control to be effected with higher accuracy than the first and second embodiments.

Figure 4:
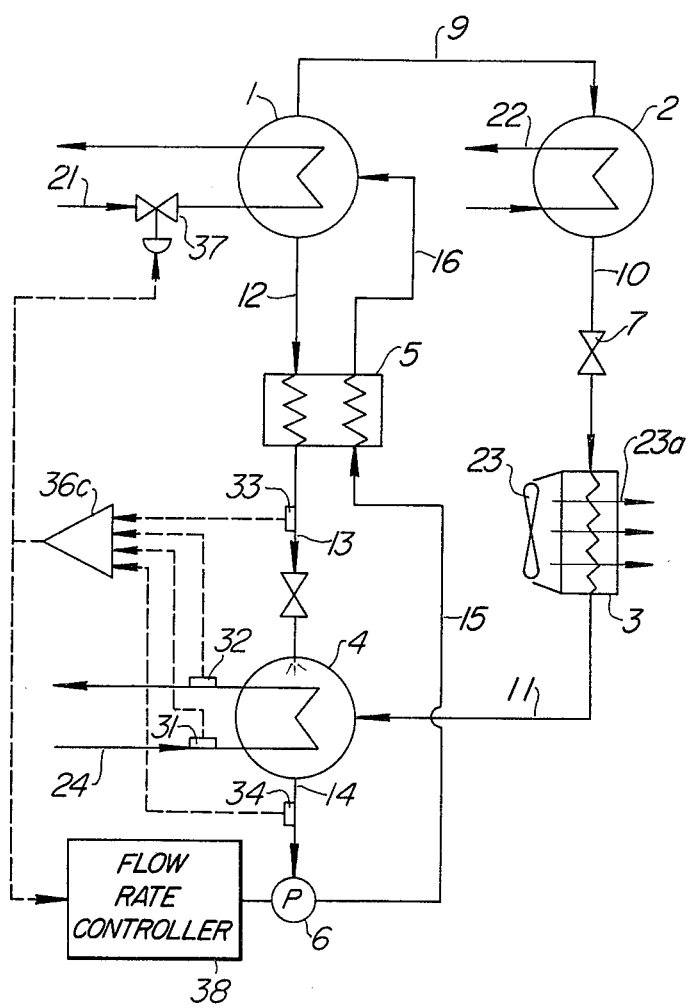
FIG. 4 is a systematic view showing a capability control apparatus according to a fourth embodiment of the invention.

FIG. 4 shows a fourth embodiment which is different from the third embodiment shown in FIG. 3 only in that the temperature sensors 33 and 34 are mounted at the inlet side and outlet side of the solution system of the absorber 4 or in the solution lines 13 and 14 respectively. Other parts are similar to those shown in FIG. 3 and their explanation will be omitted.

In this construction, temperatures at the inlet and outlet of the cooling system 24 for cooling the absorber 4 are detected by the temperature sensors 31 and 32 respectively, and temperatures of the solution at the inlet and outlet of the solution system flowing through the absorber 4 are detected by the temperature sensors 33 and 34 respectively. The values obtained by these sensors are fed into the arithmetic unit 36C to be calculated therein. The arithmetic unit 36C issues a control signal and supplies same to the control valve 37 for the heating system and the flow rate controller 38 for the liquid pump 6, to effect control of the amount of heat $Q_G$ to be given to the generator 1 and the volume G of the solution in circulation depending on the refrigerating load $Q_E$ obtained based on the equation (4). The degree of accuracy with which control is effected can be further increased in the fourth embodiment as compared with the first to third embodiments.

Figure 5:
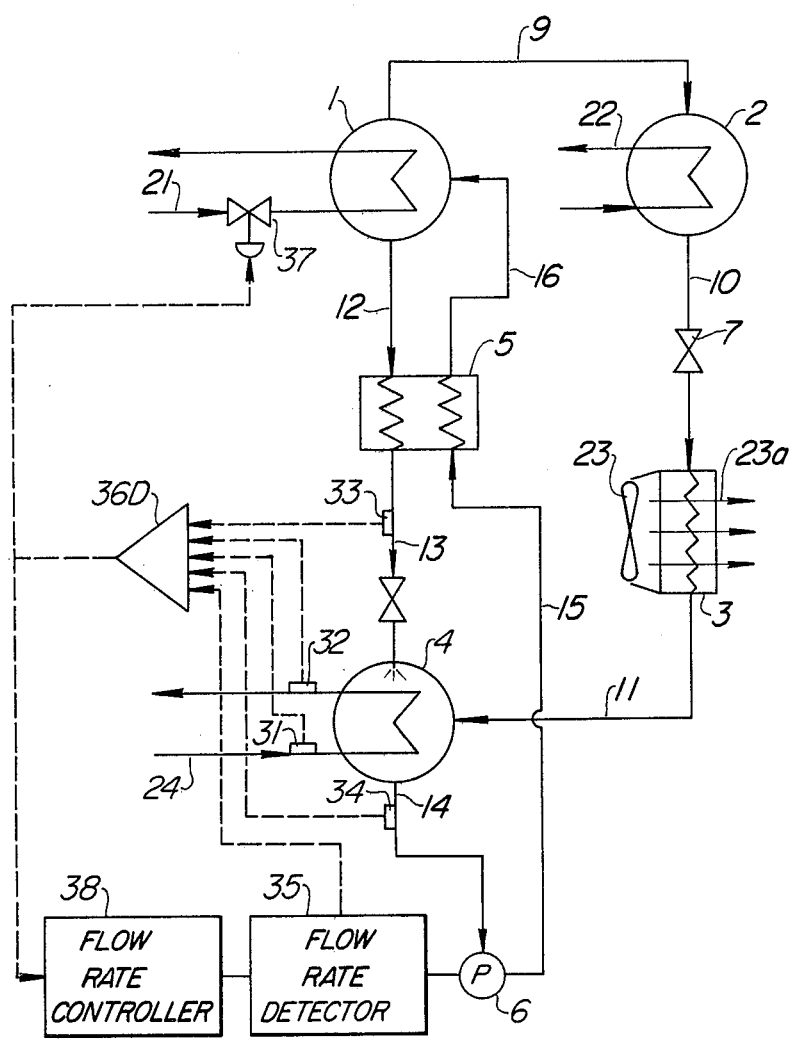
FIG. 5 is a systematic view showing a capability control apparatus according to a fifth embodiment of the invention.

The fifth embodiment shown in FIG. 5 is different from the fourth embodiment shown in FIG. 4 only in that a flow rate detector 35 is mounted between the liquid pump 6 and the flow rate controller 38 attached to the liquid pump 6. The flow rate detector 35 is connected to the arithmetic unit 36D. Other parts are similar to those shown in FIG. 4 and their explanation will be omitted. The flow rate detector 35 used in this embodiment may be of any known type of flow meter, such as the one using an orifice, turbine flow meter, etc.

In this construction, temperatures at the inlet and outlet of the cooling system 24 for cooling the absorber 4 are detected by the temperature sensors 31 and 32 respectively, temperatures of the solution at the inlet and outlet of the solution system flowing through the absorber 4 are detected by the temperature sensors 33 and 34 respectively, and the volume of the solution in circulation is detected by the flow rate detector 35. The values detected by the sensors 31 to 34 and the flow rate detector 35 are fed into the arithmetic unit 36D which issues a control signal and transmits the same to the control valve 37 for the heating system and the flow rate controller 38 for the liquid pump 6, to actuate the valve 37 and controller 38 in such a manner that the amount of heat $Q_G$ to be given to the generator 1 and the volume G of the solution in circulation are controlled based on the equation (7) or (8) depending on the refrigerating load $Q_E$ obtained based on the equation (4). The degree of accuracy with which control is effected can be increased in the fifth embodiment as compared with the first to fourth embodiment. By controlling the volume of the solution in circulation depending on the refrigerating load, it is possible to reduce the amount of heat and the power for operating the refrigerating machine.

What is claimed is:

1. In a capability control apparatus for a cooling system including a direct expansion type evaporator, a generator and an absorber, said apparatus comprising:
    a first temperature sensor mounted at an inlet side of a cooling system for said absorber;
    a second temperature sensor mounted at an outlet side of said cooling system for said absorber;
    control means mounted in a heating system for said generator for regulating the amount of heat given to said generator; and
    an arithmetic unit for actuating said control means, said arithmetic unit being operative to calculate the amount of heat to be given to said generator based on temperature signals supplied from both of said temperature sensors indicating temperatures at the inlet and outlet of said cooling system for said absorber, to thereby actuate said control means.

2. A capability control apparatus as set forth in claim 1, further comprising a third temperature sensor mounted at an inlet side of a solution system for said absorber, a fourth temperature sensor mounted at an outlet side of said solution system for said absorber, said arithmetic unit being operative to calculate the amount of heat to be given to said generator based on signals from said first and second temperature sensors mounted at the inlet and outlet sides of said cooling system for said absorber and signals from said third and fourth temperature sensors mounted at the inlet and outlet sides of said solution system for said absorber, to thereby actuate said control means.

3. A capability control apparatus as set forth in claim 1, further comprising a flow rate controller for regulating the volume of a solution delivered by a pump for supplying under pressure the solution in the absorber to the generator, said arithmetic unit being operative to calculate the amount of heat to be given to the generator and the volume of the solution to be delivered by the pump based on signals from said first and second temperature sensors mounted at the inlet and outlet sides of the absorber, to thereby actuate said control means and said flow rate controller.

4. A capability control apparatus as set forth in claim 2, further comprising a flow rate controller for regulating the volume of a solution delivered by a pump for supplying under pressure the solution in the absorber to the generator, said arithmetic unit being operative to calculate the amount of heat to be given to the generator and the volume of the solution to be delivered by the pump based on signals from said first and second temperature sensors mounted at the inlet and outlet sides of the cooling system for said absorber and signals from said third and fourth temperature sensors mounted at the inlet and outlet sides of the solution system for the absorber, to thereby acuate said control means and said flow rate controller.

5. A capability control apparatus as set forth in claim 2, further comprising a flow rate controller for regulating the volume of a solution delivered by a pump for supplying under pressure the solution in the absorber to the generator, and a flow rate detector for detecting the flow rate of the solution delivered by the pump, said arithmetic unit being operative to calculate the amount of heat to be given to the generator and the volume of the solution to be delivered by the pump based on signals from said first and second temperature sensors mounted at the inlet and outlet sides of the cooling system for the absorber, signals from said third and fourth temperature sensors mounted at the inlet and outlet sides of the solution system for the absorber, and a signal from said flow rate detector, to thereby actuate said control means for the heating system for the generator and said flow rate controller.

6. A capability control apparatus as set forth in any one of claims 1-5, wherein said arithmetic unit effects calculation based on the signals from each of said sensors and said detector from the following equation:

$$Q_E = (K_1/K_3)[K_2(t_o - t_i) - K_4 \cdot G(T_i - T_o)]$$

where $Q_E$ is cooling capabilities; $K_1$, $K_2$, $K_3$ and $K_4$ are constants; $t_i$ is the inlet temperature of the cooling system for the absorber; $t_o$ is the outlet temperature of the cooling system for the absorber; $T_i$ is the inlet temperature of the solution in the absorber; $T_o$ is the outlet temperature of the solution in the absorber; and G is the volume of the solution in circulation which is proportional to the volume of the solution delivered by the pump.

* * * * *